United States Patent [19]

Orii et al.

[11] Patent Number: 4,652,626
[45] Date of Patent: Mar. 24, 1987

[54] HIGH MODULUS CHOLESTERIC LIQUID CRYSTAL POLYESTERS

[75] Inventors: Shingo Orii, Kawasaki; Hajime Hara, Fujisawa; Tetsuo Satoh, Yokohama; Tomohiro Toya, Yokohama; Shigeki Iida, Yokohama, all of Japan

[73] Assignee: Nippon Oil Company, Limited, Japan

[21] Appl. No.: 833,909

[22] Filed: Feb. 26, 1986

[30] Foreign Application Priority Data

Feb. 28, 1985 [JP] Japan .................................. 60-37681

[51] Int. Cl.$^4$ ....................... C08G 63/02; C08G 63/18
[52] U.S. Cl. .................................... 528/194; 264/176; 528/176.1; 528/195
[58] Field of Search .................. 528/176, 194, 195

[56] References Cited

U.S. PATENT DOCUMENTS

| | | | |
|---|---|---|---|
| 4,146,702 | 3/1979 | Morris et al. ....................... | 528/191 |
| 4,242,496 | 12/1980 | Jackson et al. ..................... | 528/190 |
| 4,390,681 | 6/1983 | Deex .................................... | 528/193 |
| 4,562,244 | 12/1985 | Yoon .................................... | 528/190 |

Primary Examiner—Lucille M. Phynes
Attorney, Agent, or Firm—Scully, Scott, Murphy & Presser

[57] ABSTRACT

A cholesteric liquid crystal polyester consisting essentially of structural units represented by the following formulae (A), (B), (C), (D) and (E):

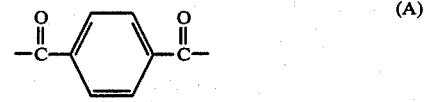

(A)

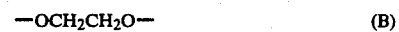

(B)

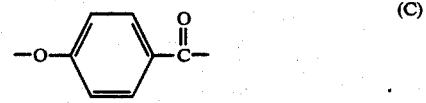

(C)

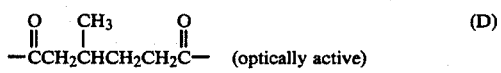

(D) (optically active)

and

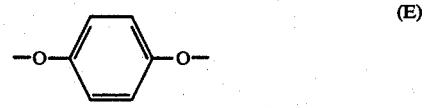 (E)

the units (A) and (B) being present each in a proportion of 5 to 50 mol %, the unit (C) present in a proportion of 20 to 80 mol %, and the units (D) and (E) present each in a proportion of 1 to 40 mol %.

7 Claims, No Drawings

HIGH MODULUS CHOLESTERIC LIQUID CRYSTAL POLYESTERS

BACKGROUND OF THE INVENTION

The present invention relates to novel aromatic polyesters capable of being subjected to melt-processing having high strength and high modulus and less anisotropic in mechanical properties.

Recently there has been an increasing demand for materials which when formed into fibers, films and shaped articles exhibit high modulus and resistance to heat and to chemicals. Although polyesters are in use for various shaped articles, many of them are inferior in mechanical properties such as flexural modulus and have therefore been unsuitable heretofore for uses requiring high strength and high modulus. As a method for improving such mechanical properties there has been known incorporating fillers or reinforcing materials such as calcium carbonate or glass fibers into polyesters. However, this method causes problems in practical use; for example, the light weight characteristic, which is a feature of plastics, is lost because of increase in specific gravity of the resulting blend, and when the blend is subjected to processing, the processing machine is susceptible gross wear.

Liquid crystal polyesters have come to be noted recently as polyesters suitable for uses requiring high strength and high modulus even without using reinforcing materials or the like. Special attention has been paid to such polyesters since W.J. Jackson made public a thermoplastic liquid crystal polyester comprising polyethylene terephthalate and hydroxybenzoic acid in U.S. Pat. No. 3,804,805 and Journal of Polymer Science Polymer Chemistry Edition, Vol. 14, page 2043 (1976). Since then, various liquid crystal polyesters have been developed and studied with a view to attaining both improvement of strength and modulus, and melt-processability. However, none of them have been put to practical use yet as shaped articles. This is because these liquid crystal polymers exhibit a high orientatability in molten condition resulting in creation of a great anisotropy in their mechanical properties.

As means for eliminating such anisotropy and attaining a high modulus and high strength biaxial oriented film, the use of a cholesteric liquid crystal polymer has been proposed by W.R. Krigbaum et al. (see U.S. Pat. No. 4,412,059). In this patent, however, aromatic polyesters are little described; only in Examples 9 and 10 there are descriptions on the preparation of polyesters, but it is not clear whether the polyesters prepared therein exhibit a cholesteric liquid crystallinity. Also as to whether high modulus and less anisotropic shaped articles are obtained therein or not, there is found no description.

SUMMARY OF THE INVENTION

It is the object of the present invention to provide novel polyesters capable of being subjected to melt-processing, having high strength and high modulus and less anisotropic in mechanical properties.

The present invention resides in a cholesteric liquid crystal polyester consisting essentially of structural units represented by the following formulae (A), (B), (C), (D) and (E):

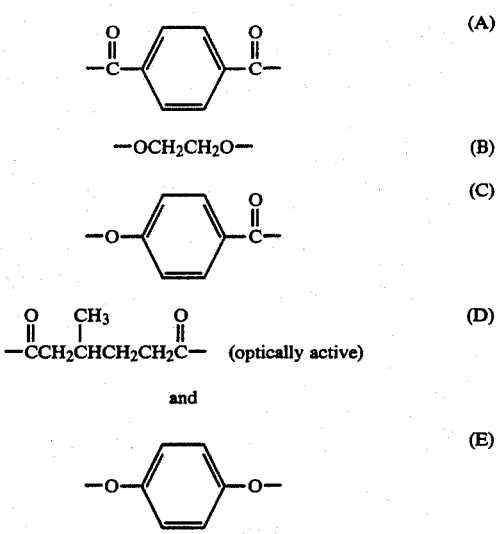

in which units (A) and (B) are each present in a proportion of 5 to 50 mol %, unit (C) 20 to 80 mol % and units (D) and (E) each 1 to 40 mol %, provided the total of (A), (B), (C), (D) and (E) is 100 mol %.

PREFERRED EMBODIMENTS OF THE INVENTION

The polyester of the present invention consists essentially of the above five structural units (A), (B), (C), (D) and (E).

The structural unit (A) is derived from terephthalic acid or a derivative thereof, e.g. dialkyl ester.

The structural unit (B) is derived from ethylene glycol or a derivative thereof, e.g. diacetoxy compound.

(A) and (B) are usually introduced in the polymer chain by using polyethylene terephthalate as a starting material. Therefore, (A) and (B) are present in equimolar proportions, each being 5 to 50 mol %.

The structural unit (C) is derived from p-hydroxybenzoic acid or a derivative thereof, e.g. acetoxylated compound. Its proportion is in the range of 20 to 80 mol %, preferably 30 to 70 mol %, based on the amount of the polyester of the invention.

The structural unit (D) is derived from 3-methyladipic acid or a derivative thereof, e.g. dialkyl ester, and it is characterized by being optically active. Its proportion is in the range of 1 to 40 mol %, preferably 3 to 30 mol %.

The structural unit (E) is derived from hydroquinone or a derivative thereof, e.g. diacetoxylated compound, and it is present in an amount equimolar to unit (D). Its proportion is in the range of 1 to 40 mol %, preferably 3 to 30 mol %.

The total of the structural units (A), (B), (C), (D) and (E) is assumed to be 100 mol %.

The structural unit (C) is essential for developing cholesteric mesophase. There may be used either D or L isomer resolved from a DL racemic mixture. Even in the case of a D-L mixture, if either one is present in a larger proportion, an optical activity is exhibited, and even such a mixture is employable. In this case, however, the helical pitch (P) in cholesteric liquid crystal becomes larger than that in a like liquid crystal using a pure D or L isomer, and thus the cholesteric mesophase forming ability becomes poor. In general, the difference in content between D and L isomers should be not less than 15%, preferably not less than 30%.

A cholesteric liquid crystal polymer has a helical structure twisted at a certain angle in which a nematic liquid crystal layer is induced by an optically active unit. The cholesteric mesophase will be colored if $\lambda_o$ falls in the range of visible wave length due to selective reflexion, where $\lambda_o = nP$ (n is the refractive index of a cholesteric polymer).

A cholesteric liquid crystal polymer having a rigid straight chain and an optically active monomer copolymerized in the main chain is expected to afford a film or sheet having a biaxially reinforced structure as if it were a liminated structure.

Thermoplastic polymers such as the cholesteric liquid crystal polyesters of the present invention are characterized by affording shaped articles which are less anisotropic in physical properties while maintaining high mechanical properties even when they result from processing at high shear rates.

As a thermoplastic cholesteric liquid crystal polymer is heated up slowly under a polarizing microscope equipped with a hot stage, it changes from a crystalline state into a liquid crystal state at a certain temperature and an oily streaks texture peculiar to cholesteric liquid crystal polymers is observed. Further, if such polymer is formed into film followed by quenching, there will remain a cholesteric liquid crystal structure and it will be possible to observe a bright cholesteric color which varies depending on the content of chiral component of the structural unit (C).

The cholesteric liquid crystal polyesters of the present invention are prepared according to a melt polymerization process. More specifically, a polyethylene terephthalate comprising the structural units (A) and (B) is prepared in advance, then monomers which afford the structural units (C), (D) and (E) are mixed with the polyethylene terephthalate and polymerization is allowed to take place under heating to a temperature of about 200°–350° C. usually at atmospheric pressure. In order to accelerate the polymerization reaction it is necessary to remove low volatile compounds produced by an ester interchange reaction such as methanol, acetic acid and acetic ester from the reaction mixture. To this end, it is desirable that the polymerization reaction be carried out under flow of nitrogen. After stop of the distilling out of such low volatiles, the polymerization is further continued in vacuo (e.g. 1 mmHg or less) until the present conversion is nearly 100% and the degree of polymerization of the resulting polymer is sufficiently high. For the purpose of accelerating the polymerization reaction there may be used alkali metal salts which have heretofore been known as polyester polymerizing catalysts, as well as metallic salts of Fe, Mn, Cd, Mg, Ba, Ti, Zn, Pb, Co and Sb, alone or in combination. Moreover, phosphorus compounds may be used as decomposition inhibitors.

The cholesteric liquid crystal polyester thus obtained can be subjected to melt-processing at a temperature not higher than 300° C. to afford a shaped article having superior mechanical properties and yet being less anisotropic in physical properties.

The following examples are given to further illustrate the present invention, but it is to be understood that the invention is not limited thereto.

EXAMPLE 1

(1) Preparation of Polyethylene Terephthalate 194.2 g (1.0 mol) of dimethyl terephthalate, 120.1 g (2.0 mol) of ethylene glycol, 40 mg of zinc acetate dihydrate and 110 mg of antimony acetate were charged into a polymerization flask equipped with a stirrer. The polymerization flask was purged with nitrogen and then placed in an oil bath held at 180° C., followed by stirring under a nitrogen gas stream for 2 hours, during which period the greater part of methanol was distilled off. Then, the degree of vacuum was raised gradually and the oil bath temperature was also increased slowly from 180° C. until reaching 0.2 mmHg and 280° C., respectively, over a period of about 50 minutes. Under this condition the stirring was continued for 2.5 hours to complete the polymerization.

Inherent viscosity ($\eta$inh) of the resultant polymer measured at a concentration of 0.5 wt. % at 30° C. using a mixed solvent of phenol/tetrachloroethane =60/40 (weight ratio) was 0.37 dl/g. (The following values of $\eta$inh were also measured in this manner.)

(2) Preparation of Cholesteric Liquid Crystal Polyester 11.5 g of the polyethylene terephthalate prepared above, 25.2 g of p-acetoxybenzoic acid, 9.6 g of (+)-3-methyladipic acid and 11.6 g of diacetoxyhydroquinone were charged into a polymerization flask equipped with a stirrer. The polymerization flask was purged with nitrogen and then placed in an oil bath held at 220° C. Reaction was allowed to take place with stirring in a nitrogen atmosphere for 1 hour. Then, the temperature was raised to 230° C. and the reaction allowed to proceed for another one hour. At 230° C. nitrogen was started to flow and after one hour the reaction was further allowed to proceed under a reduced pressure for 1 hour. The reaction temperature was then raised from 230° C. to 270° C. over a period of about 30 minutes and the reaction system was held at 270° C. and at a vacuum of 0.2 mmHg for 1 hour to complete the polymerization. Yield 87%, $\eta$inh =0.52 dl/g.

(3) Forming into Film 1 g of the polymer thus obtained was placed centrally in a 18 cm by 5 cm aluminum frame (fabricated to permit only longitudinal flowing), then heated to 240° C. and pressed, followed by quenching in ice water, to obtain a film having a thickness of about 100 $\mu$m. This film had a bright cholesteric color and its CD (circular dichroism) spectrum exhibited a peak at 413 nm.

Test pieces were cut out in both parallel and perpendicular directions from both end portions of the film where considerable flowing had been allowed during the processing, and their mechanical properties were measured, results of which will be later tabulated in this text.

EXAMPLE 2

Polymerization was carried out under the same conditions as in Example 1 except that the amount of (+)-3-methyladipic acid and that of diacetoxyhydroquinone were changed to 6.4 g and 7.8 g, respectively, to afford a polymer of $\eta$inh =0.59 dl/g. Yield 85%.

Film was formed from the polymer. It had a bright cholesteric color and its CD spectrum exhibited a peak at 500 nm. Its mechanical properties were measured, results of which will be tabulated later in this text.

EXAMPLE 3

Polymerization was carried out under the same conditions as in Example 1 except that the amount of (+)-3-methyladipic acid and that of diacetoxyhydroquinone were changed to 3.2 g and 3.9 g, respectively, to afford a polymer of ηinh =0.53 dl/g. Yield 90%.

Film was formed from this polymer. It CD spectrum exhibited a broad peak at 700–800 nm. Test pieces were cut out from the film and measured for mechanical properties, results of which will be tabulated later.

EXAMPLE 4

Polymerization was carried out under the same conditions as in Example 1 except that the amount of (+)-3-methyladipic acid and that of diacetoxyhydroquinone were changed to 1.6 g and 1.9 g, respectively, to afford a polymer of ηinh =0.52 dl/g. Yield 87%.

Film was formed from this test pieces were cut out from the film and measured for mechanical properties, results of which will be tabulated later.

COMPARATIVE EXAMPLE 1

Polymerization was carried out under the same conditions as in Example 1 except that 9.6 g of a racemic mixture was used in place of (+)-3=methyladipic acid, to afford a polymer of ηinh =0.80 dl/g in 92% yield. Film was formed from this polymer, but a cholesteric color was not recognized, although the film was opaque. Test pieces were cut out from the film and measured for mechanical properties, results of which will be tabulated later.

COMPARATIVE EXAMPLE 2

Polymerization was carried out as follows in accordance with Example 1 of U.S. Pat. No.3,804,805. 69.1 g of the polyethylene terephthalate prepared above in Example 1-(1) of the present invention and 97.2 g of p-acetoxybenzoic acid were charged into a polymerization flask equipped with a stirrer. The polymerization flask was purged with nitrogen and then placed in a 275° C. oil bath. Stirring was made in a nitrogen gas stream for 1 hour. Then, the degree of vacuum was raised gradually to 0.5 mmHg and stirring was continued at 275° C. for 4 hours to complete the polymerization. A nematic liquid crystal polymer of ηinh =0.90 dl/g was obtained in 90% yield.

Using this polymer, a film having a thickness of about 100 μm was obtained by pressing under the same conditions as in Example 1 except that the pressing temperature was changed to 270° C. Test pieces were cut out from the film and measured for mechanical properties, results of which are as shown in table below.

maintain high strength and high modulus and are less anisotropic in their mechanical properties, even after subjected to processing under high shear rates.

What is claimed is:

1. A cholesteric liquid crystal polyeser consisting essentially of structural units represented by the following formulae (A), (B), (C), (D) and (E):

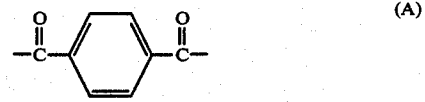 (A)

 (B)

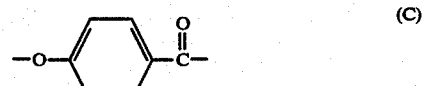 (C)

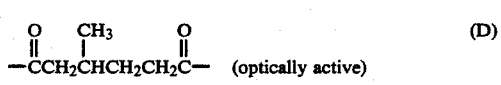 (optically active) (D)

and

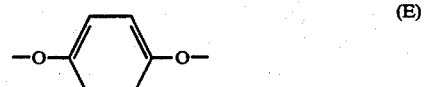 (E)

the units (A) and (B) being present each in a proportion of 5 to 50 mol %, the unit (C) present in a proportion of 20 to 80 mol %, and the units (D) and (E) present each in a proportion of 1 to 40 mol %.

2. A cholesteric liquid crystal polyester as set forth in claim 1, wherein the units (A) and (B) are present in equimolar proportions.

3. A cholesteric liquid crystal polyester as set forth in claim 1, wherein the unit (C) is present in a proportion of 30 to 70 mol %.

4. A cholesteric liquid crystal polyester as set forth in claim 1, wherein said optically active unit is derived from at least a partially resolved D or L isomer of a racemic mixture.

5. A cholesteric liquid crystal polyester as set forth in claim 1, wherein the units (D) and (E) are present in equimolar proportions.

6. A cholesteric liquid crystal polyester as set forth in claim 5, wherein the units (D) and (E) are present each in a proportion of 3 to 30 mol %.

7. A high modulus and high strength biaxially oriented film which is formed from the cholesteric liquid crystal polyester of claim 1.

* * * * *

TABLE

Measurement results of mechanical properties of films

| | Mesophase | CD Spectrum Peak nm | *1 $T_\parallel$ MPa | *1 $T_\perp$ MPa | $T_\parallel / T_\perp$ Ratio | *1 $M_\parallel$ GPa | *1 $M_\perp$ GPa | $M_\parallel / M_\perp$ Ratio |
|---|---|---|---|---|---|---|---|---|
| Example 1 | Cholesteric | 413 | 49 | 33 | 1.5 | 3.1 | 2.4 | 1.3 |
| Example 2 | " | 500 | 46 | 30 | 1.5 | 3.5 | 2.8 | 1.3 |
| Example 3 | " | 700 800 | 57 | 50 | 1.1 | 4.4 | 3.9 | 1.1 |
| Example 4 | " | — | 55 | 38 | 1.4 | 4.4 | 3.0 | 1.5 |
| Comparative Example 1 | Nematic | 0 | 63 | 21 | 3.0 | 4.4 | 1.0 | 4.4 |
| Comparative Example 2 | " | 0 | 97 | 22 | 4.4 | 3.1 | 1.1 | 2.8 |

*1 T and M represent tensile strength and tensile modulus, respectively. The subscript ∥ represents a direction parallel to the flow and ⊥ represents a direction perpendicular to the flow.

From the above Examples it is seen that the cholesteric liquid crystal polyesters of the present invention